(12) United States Patent
Barker et al.

(10) Patent No.: US 10,599,993 B2
(45) Date of Patent: *Mar. 24, 2020

(54) DISCOVERY OF IMPLICIT RELATIONAL KNOWLEDGE BY MINING RELATIONAL PATHS IN STRUCTURED DATA

(71) Applicant: International Business Machines Corporation, Armonk, NY (US)

(72) Inventors: Kenneth J. Barker, Mahopac, NY (US); Mihaela A. Bornea, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 978 days.

This patent is subject to a terminal disclaimer.

(21) Appl. No.: 15/004,009

(22) Filed: Jan. 22, 2016

(65) Prior Publication Data

US 2017/0213136 A1 Jul. 27, 2017

(51) Int. Cl.
| | | |
|---|---|---|
| *G06N 20/00* | (2019.01) | |
| *G06N 5/02* | (2006.01) | |
| *G06N 5/04* | (2006.01) | |

(52) U.S. Cl.
CPC .............. *G06N 20/00* (2019.01); *G06N 5/02* (2013.01); *G06N 5/022* (2013.01); *G06N 5/04* (2013.01)

(58) Field of Classification Search
CPC ........ G06N 99/005; G06N 5/02; G06N 5/022; G06N 5/04; Y04S 10/54; G06F 17/3053; G06F 17/30598; G06F 17/30395; G06F 17/30457

USPC .......................................................... 706/46
See application file for complete search history.

(56) References Cited

U.S. PATENT DOCUMENTS

| | | | |
|---|---|---|---|
| 7,574,454 B2 | 8/2009 | Lee | |
| 8,356,053 B2 | 1/2013 | Murthy et al. | |
| 8,407,081 B1 | 3/2013 | Rajasenan | |
| 8,751,505 B2 | 6/2014 | Carmel et al. | |
| 2004/0093331 A1 | 5/2004 | Gamer et al. | |
| 2006/0036592 A1 | 2/2006 | Das et al. | |
| 2008/0140679 A1* | 6/2008 | Deyo | G06F 17/30867 |
| 2009/0077062 A1 | 3/2009 | Spivack et al. | |
| 2017/0300833 A1 | 10/2017 | Barker et al. | |

FOREIGN PATENT DOCUMENTS

| | | |
|---|---|---|
| WO | 2011133017 | 10/2011 |
| WO | 2011151500 | 12/2011 |

OTHER PUBLICATIONS

Roberts et al. "Mining clinical relationships from patient narratives", BMC Bioinformatics, 2008. (Year: 2008).*
Eronen et al., "Arrangement and Method for Finding Relationships Among Data", WO 2011/151500 A1, 2011. (Year: 2011).*

(Continued)

*Primary Examiner* — Dave Misir
(74) *Attorney, Agent, or Firm* — Reza Sarbakhsh; Edell, Shapiro & Finnan, LLC (57) ABSTRACT

Predefined relation items on paths traversing predefined entities of a knowledge base are collected and feature sets are assembled from the collected relation items. A classifier is computed for the feature sets and a relation score of a query pair of the entities is computed using the classifier.

10 Claims, 5 Drawing Sheets

(56) References Cited

OTHER PUBLICATIONS

Berant et al., "Global Learning of Typed Entailment Rules", Proceedings of the 49th Annual Meeting of the Association for Computational Linguistics, pp. 610-619, Portland, Oregon, Jun. 19-24, 2011. (Year: 2011).*

Berant et al., "Global Learning of Focused Entailment Graphs", Proceedings of the 48th Annual Meeting of the Association for Computational Linguistics, pp. 1220-1229, Uppsala, Sweden, Jul. 11-16, 2010. (Year: 2010).*

Nickel et al., "A Three-Way Model for Collective Learning on Multi-Relational Data", Proceedings of the 28th International Conference on Machine Learning, Bellevue, WA, 2011, 8 pages.

Socher et al., "Reasoning with Neural Tensor Networks for Knowledge Base Completion", Dec. 2013, 10 pages.

Bornea et al., "Relational Path Mining in Structured Knowledge", K-CAP, Oct. 2015, Palisades, NY, 7 pages.

List of IBM Patents or Patent Applications Treated as Related, Jul. 2017, 1 page.

\* cited by examiner

DISCOVERY OF IMPLICIT RELATIONAL KNOWLEDGE BY MINING RELATIONAL PATHS IN STRUCTURED DATA

STATEMENT REGARDING PRIOR DISCLOSURES BY THE INVENTORS

The following disclosure is submitted under 35 U.S.C. 102(b)(1)(A): Relational Path Mining in Structured Knowledge, Mihaela BORNEA and Ken BARKER, *K-CAP* 2015, Oct. 9, 2015, Palisades, N.Y., USA.

BACKGROUND

1. Technical Field

Present invention embodiments relate to knowledge discovery in structured data, and more specifically, to discovery of implicit relations in structured knowledge bases.

2. Discussion of the Related Art

Relational knowledge is important content for many tasks. Information Extraction, Question Answering and Knowledge Discovery are applications for which relational knowledge is essential. Examples of information needs for relational knowledge include:

"Who directed the movie Jaws?"
{(Jaws_(film) director ?d).}
"What conferences are in New York?"
{(?c a Conference).
(?c location New_York_City).}
"What drugs treat anemia?"
{(?d a Drug).
(Anemia may_be_treated_by ?d).}

To satisfy such information needs, intelligent systems typically rely on large knowledge repositories relevant to the particular domain of discourse. The knowledge can be acquired through Natural Language Processing (NLP) techniques over large corpora. It can also be curated by domain communities. Both forms of Knowledge Capture have limitations that affect the performance on target tasks.

Corpus-based techniques can produce noisy knowledge graphs whose semantic granularity matches the textual expression of relational knowledge, but may not match what is required of a given task. For example, a text may mention a "test for splenic fever", but a particular task (that is dependent on a knowledge base, for example) may require a more fine-grained representation, such as:

(Test has_component b.anthracis)
(b.anthracis causative_agent_of splenic fever)

The most glaring weakness of curated knowledge bases, on the other hand, has traditionally been poor coverage.

Accordingly, those interested in exploiting curated knowledge have long believed that if only enough structured domain knowledge was available, these repositories could be used directly to solve the information needs of our intelligent systems. Relational knowledge, for example, could simply be "looked up" in the knowledge base.

In several domains, such as biomedicine, large, curated knowledge repositories are now available. Yet, such repositories are still inadequate for many of the intelligent tasks for which we would use them. In many cases, they seem just as noisy as automatically extracted sources, the grain of their representations is just as inappropriate, and the semantics are just as vague.

SUMMARY

According to one embodiment of the present invention, predefined relation items on paths traversing predefined entities of a knowledge base are collected and feature sets are assembled from the collected relation items. A classifier is computed for the feature sets and a relation score of a query pair of the entities is computed using the classifier.

DETAILED DESCRIPTION

The present inventive concept is best described through certain embodiments thereof, which are described in detail herein with reference to the accompanying drawings, wherein like reference numerals refer to like features throughout.

It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

Figure 1:
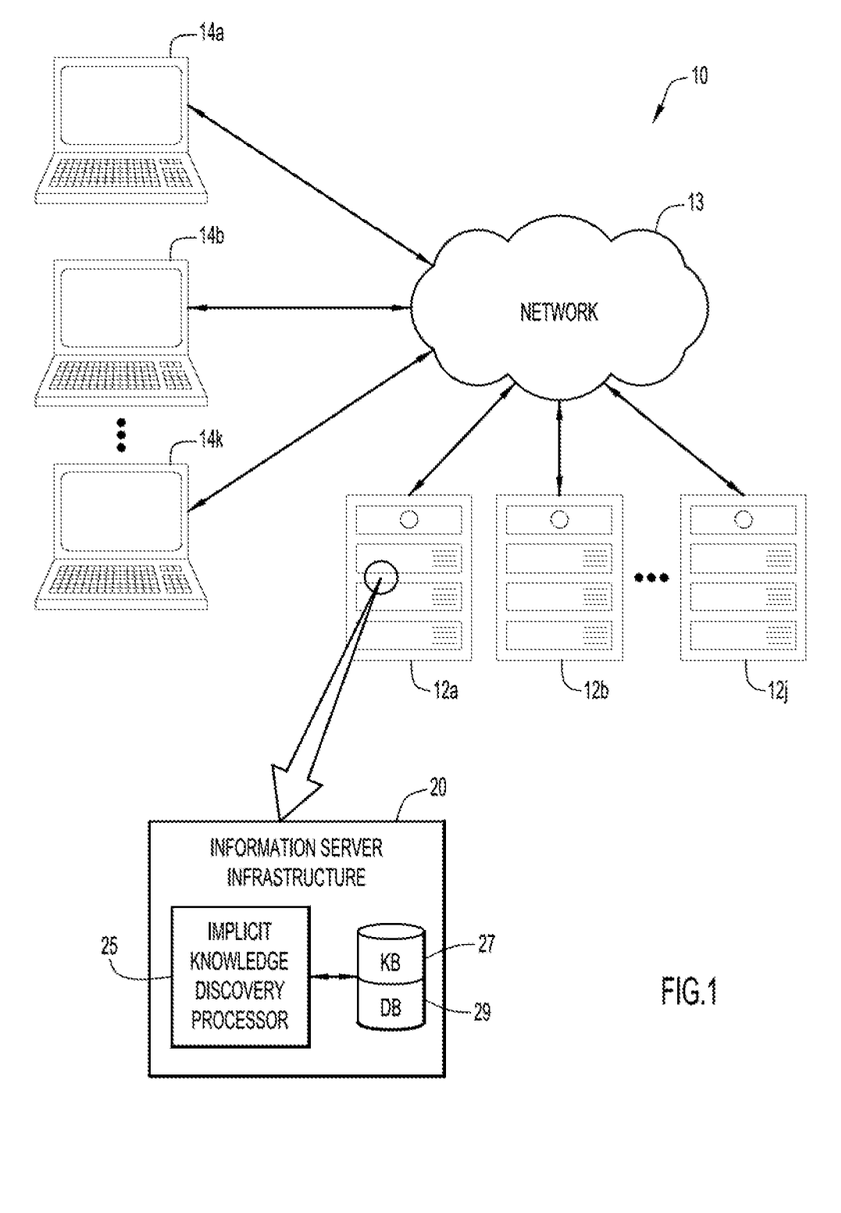
FIG. 1 is an illustration of a computing environment in which the present general inventive concept can be embodied.

An example environment for use with present invention embodiments is illustrated in FIG. 1 as enterprise infrastructure 10. As is illustrated, the environment includes one or more server systems 12*a*-12*j*, representatively referred to herein as server system(s) 12, and one or more client or end-user systems 14*a*-14*k*, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate with each other through direct or line-of-sight techniques, e.g., wireless radio links, fiber-less optical links, etc. In certain implementations, services and various functions of server systems 12 and those of client systems 14 may be performed by common circuitry and shared computational resources in a device such as a workstation.

Server systems 12 and client systems 14 may be implemented by any conventional or other computer systems preferably equipped with a display or monitor, a base (e.g., including at least one processor (not illustrated), one or more memories (not illustrated) and/or internal or external network interfaces or communications devices, e.g., modem, network cards, etc. (not illustrated), optional input devices, e.g., a keyboard, mouse or other input device (not illustrated), and any commercially available, open-source and custom software, e.g., operating system, server/communications software, browser/interface software, etc.

One or more processors and one or more storage devices of server systems 12 may be configured or otherwise constructed to implement an information server infrastructure (ISI) 20 by which enterprise information from heterogeneous data sources utilizing differing conceptual, contextual and typographical representations is collected, stored and managed in a unified data framework. ISI 20 may implement an implicit knowledge discovery processor (IKDP) 25, a knowledge base (KB) 27 and/or a database (DB) 29. Knowledge base 27 may be constructed in accordance with a particular domain of discourse. For purposes of description, a medical domain will be assumed throughout this disclosure and, upon review of this disclosure, those skilled in the pertinent arts will recognize other domains that can be used in conjunction with the present invention without departing from the spirit and intended scope thereof.

The exemplary embodiments described herein are directed to determining semantic relations among entities in Electronic Medical Record (EMR) data. An EMR is a collection of structured and unstructured medical information corresponding to a particular patient. This data includes, among other things, the patient's medical problems, medications and medical procedures. Relation extraction embodiments of the present invention may be part of a larger EMR summarization project that aims to produce summaries of EMRs. In many cases, the relationships between, for example, medications and the medical problems they treat, or procedures and the medical problems they target are not explicit. For example, in EMRs, medications and procedures often do not appear in the same sentence as the medical problems they treat or target. In fact, while medical problems are often mentioned in the free text portions of the EMR, medications and procedures are often given in separate tables. Relation extraction techniques, such as those described herein, are required to make these relationships explicit.

The co-location of information problem would not be an issue if we could simply look up the relational knowledge in a structured knowledge base. One such structured data source is the Unified Medical Language System (UMLS), which is rich in relational knowledge, including relations linking medications, procedures and problems. In the exemplary embodiments described herein, knowledge base 27 is constructed in accordance with UMLS. Those having skill in knowledge representation in other domains of discourse will recognize and appreciate analogous language systems on which the present invention can be practiced after review of this disclosure.

Figure 2:
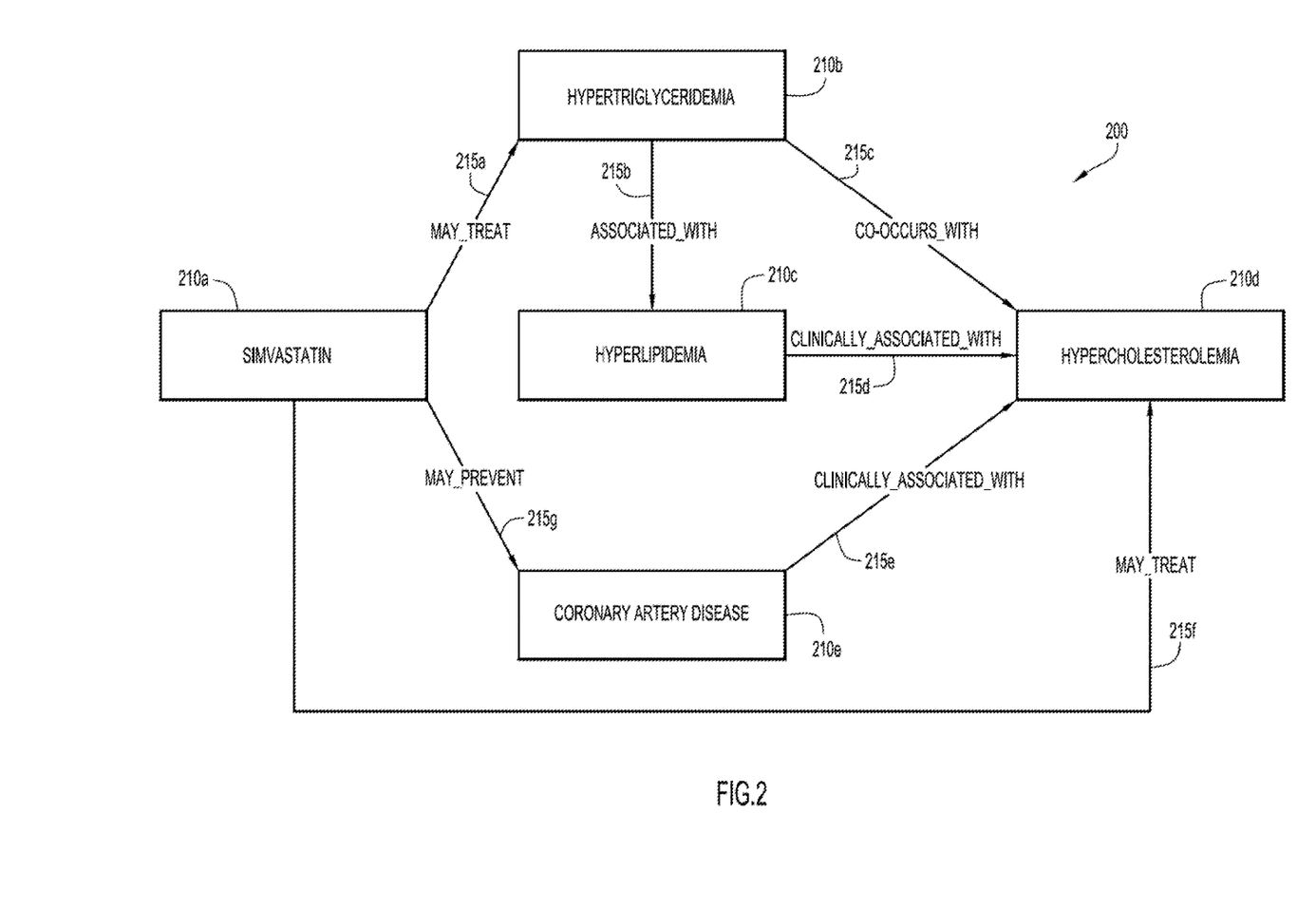
FIG. 2 is a directed graph of an information model that can be used in conjunction with embodiments of the present general inventive concept.

FIG. 2 is a directed graph diagram logically representative of an exemplary UMLS information model 200, such as might be configured in KB 27. Exemplary information model 200 comprises entities 210a-210e, which are database objects descriptive of or otherwise representing "things," and relations 215a-215g, which are database objects descriptive of or otherwise representing relationships between things. For purposes of succinctness, entities 210a-210e will be representatively referred to herein as entity (or entities) 210 and relations 215a-215g will be representatively referred to herein as relation(s) 215.

Entities 210 may be explicitly associated by a relation 215 to form known entity pairs, such as entity pair (Simvastatin 210a, Hypertriglyceridemia 210b), which is associated by UMLS relation item may_treat 215a. As used herein, a "relation item" is a knowledge base object that indicates the type of relation with which it is associated. The entity pair (Simvastatin 210a, Hypertriglyceridemia 210b) represents the domain knowledge that "Simvastatin may treat Hypertriglyceridemia," and is an example of a direct relation. That is, no other entity is interposed on the path realized by relation 215a between entities 210a and 210b. Another known entity pair is (Simvastatin 210a, Hypercholesterolemia 210d), which is also associated by a direct UMLS relation item may_treat 215f. The (Simvastatin 210a, Hypercholesterolemia 210d) entity pair is also related through other entities 210, for example through entity 210b, entity 210e and entities 210b and 210c. These entities are interposed on the respective paths between entities 210a and 210d and, as such, realize indirect relations between those entities. The indirect relations 215 between entities 210a and 210d form respective paths on which is carried implicit relations sought by embodiments of the present invention.

In one embodiment, feature sets may be created from the relation items 215 on each path between training entities that can be used for machine learning of implicit relations between those entities. Query entities may be provided to the system and a relation score for the query entities may be returned based on the machine learning.

For example, in FIG. 2, the following path information may be derived:

Simvastatin may_treat Hypertriglyceridemia co_occurs_with Hypercholesterolemia

Simvastatin may_treat Hypertriglyceridemia associated_with Hyperlipidemia clinically_associated_with Hypercholesterolemia Simvastatin may_prevent Coronary Artery Disease clinically_associated_with Hypercholesterolemia Simvastatin may_treat Hypercholesterolemia The path information may be converted into a feature set by replacing the entity names with corresponding variables EA-EE:

?EA may_treat ?EB co_occurs_with ?ED

?EA may_treat ?EB associated_with ?EC clinically_associated_with ?ED

?EA may_prevent ?EE clinically_associated_with ?ED

?EA may_treat ?ED

Certain embodiments implement a classifier that takes feature sets such as the foregoing and generates a set of classifier weights. Each feature may be assigned a value; one such approach assigns an initial value of one (1) to each feature. These "weights" are combined with the feature values to obtain a number indicating the probability of two entities being related. In the training phase of the classifier, the weights are determined such that the probability of the entity pairs in the positive examples, where the entities are explicitly associated, is maximized and the probability of entity pairs in the negative examples, where the entities are explicitly unassociated, is minimized.

Embodiments of the present invention address the weaknesses of both text-based and knowledge-based relation extraction in obtaining implicit relations between entity pairs (e.g., medication-medical problem pairs and procedure-medical problem pairs). Known entity pairs may be used as training data to mine UMLS for relational paths.

These paths are then used as features to train a suitable classifier for each relation. The resulting classifiers significantly outperform simple knowledge base lookup as well as classifiers based on corpus-derived features.

Figure 3A:
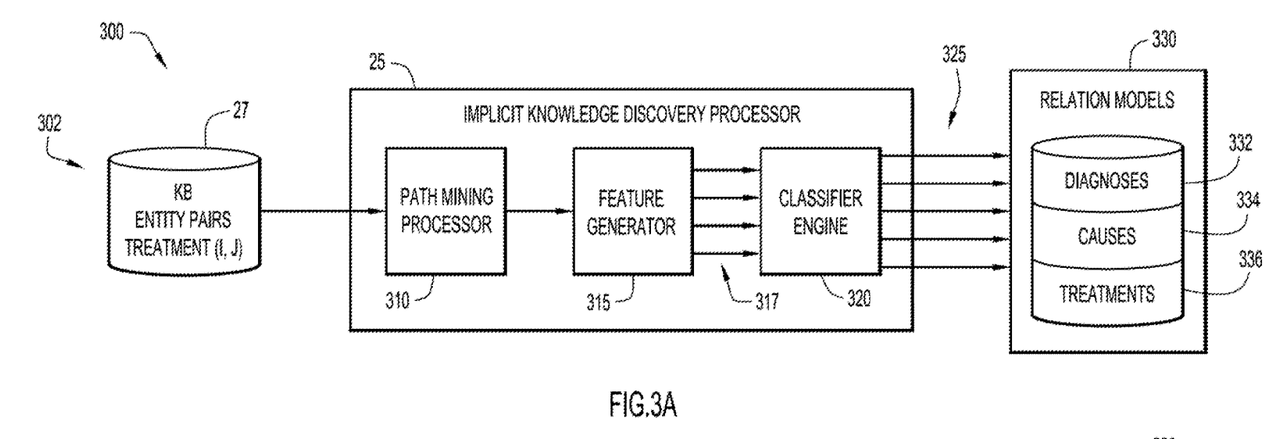
FIGS. 3A-3B are schematic block diagrams of information service implementations embodying the present general inventive concept.
Figure 3B:
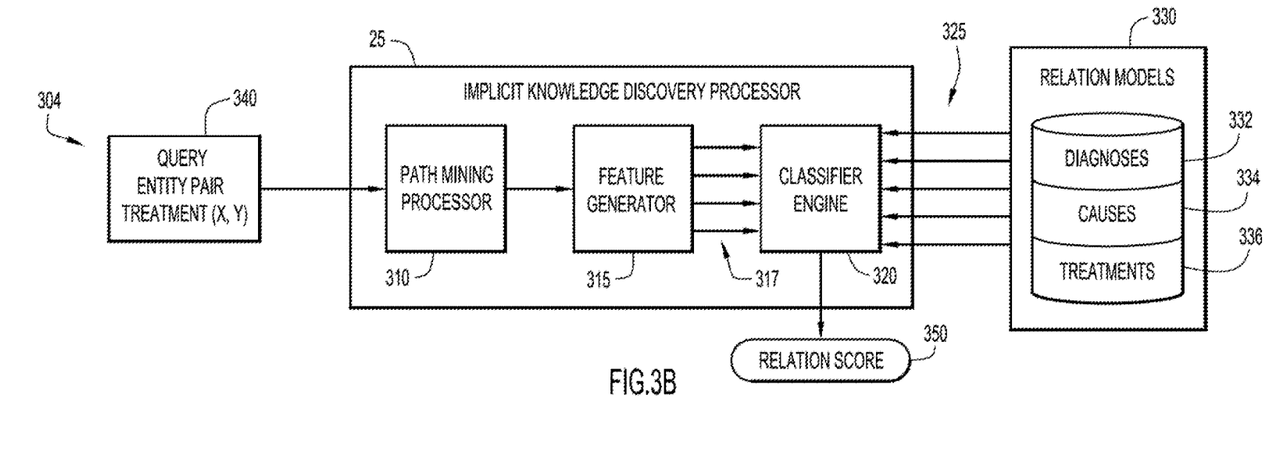

FIG. 3, comprising FIGS. 3A-3B, is a schematic block diagram of an exemplary information service 300 embodiment of the present invention, which may be implemented on, for example, ISI 20. For purposes of explanation and not limitation, information service 300 will be described as occurring in two operational phases: a feature-extraction/training phase 302, or simply training phase 302, and a query phase 304. Relation models 330, which comprise the trained classifiers, may be constructed and trained based on relations between entities mined from KB 27. Once trained, relation models 330 can provide a relation score 350 indicative of a relation between entities formed in a query. Accordingly, certain embodiments of the present invention may implement relation models for different relation types, e.g., a diagnoses relation model 332, a causes relation model 334 and a treatments relation model 336.

IKDP 25 may include a path mining processor component 310, a feature generator component 315 and a classifier component 320. Path mining processor 310 traverses paths formed by direct and indirect relations between input entities. For example, consider a relational path of length two (two relations) that appears between a medical procedure and medical problem, where the argument concepts are represented by their UMLS Concept Unique Identifier (CUI):

C1524153 analyzes C0030471 finding_site_of C0037199.

This example shows a positive pair of a medical procedure C1524153 (Sinuses CT WO contrast) and a medical problem C0037199 (Sinusitis). There is no single relation in UMLS directly connecting these concepts. However, this example shows there is a connection between the two concepts through a relational path: the procedure analyses a body part C0030471 (Nasal Sinus) and this body part is the finding site of the medical problem.

To use these paths for relation extraction with new argument pairs, the arguments may be converted to variables, resulting in a generalized path:

?C1 analyzes ?C2 finding_site_of ?C3

For compactness and simplicity, generalized paths will be referred to herein by the concatenation of their relation types only, i.e.:

analyzes.finding_site_of

Generalized paths such as this one may also appear in between negative examples; that is, they could equally be a counter-indication of the procedure-medical problem relation. The following arguments are also connected by the example generalized path:

C0881998 analyzes C0000726 finding_site_of C0232483

In this case, the medical procedure C0881998 (Abdomen X-ray AP) analyzes the body part C0000726 (Abdomen) which is the finding site of the medical problem C0232483 (Reflux). In this case, however, x-rays are not used to treat or diagnose reflux, as would be implicitly established in KB 27.

Feature generator 315 may be constructed or otherwise configured to form a feature set 317 from the generalized path information obtained from path mining processor 310. For example, using information model 200 of FIG. 2, the generalized paths include:

may_treat.associated_with.clinically_associated_with;
may_treat.co-occurs_with;
may_prevent.clinically_associated_with; and
may_treat.

Each of these generalized paths may be a member of feature set 317, which may be provided to classifier engine 320. Classifier engine 320, in turn, may compute a classifier, e.g., through a set of weights 325, for the relation under training. The computed classifier may be stored in relation models 330 under the particular relation to which it applies (e.g., diagnoses 332, causes 334 or treatments 336).

The present invention is not limited to a particular machine learning classification technique; logistic regression, support vector machines and neural networks are among the various classification techniques that can be used in conjunction with the present invention. For example, Liblinear is an open source library for large linear classification tasks that can handle millions of instances and features. LibLinear supports logistic regression and linear support vector machines, and provides a wide range of classification algorithms. The classifiers in certain embodiments of the present invention may be built using L1 regularization with C=1 and a coordinate descent algorithm as a solver.

Query phase 304 is similar to training phase 302 in many of its operations: relational paths between a query entity pair 340 are mined by path mining processor 310 and a feature set 317 is generated from generalized path information by feature generator 315. In query phase 304, however, classifier engine 320 applies the appropriate classifier retrieved from the relation models 330 that corresponds to the query 340. Classifier engine 320 may compute a relation score 350 that indicates a measure of how well the query entity pair are related, such as by a probability indicator.

Figure 4A:
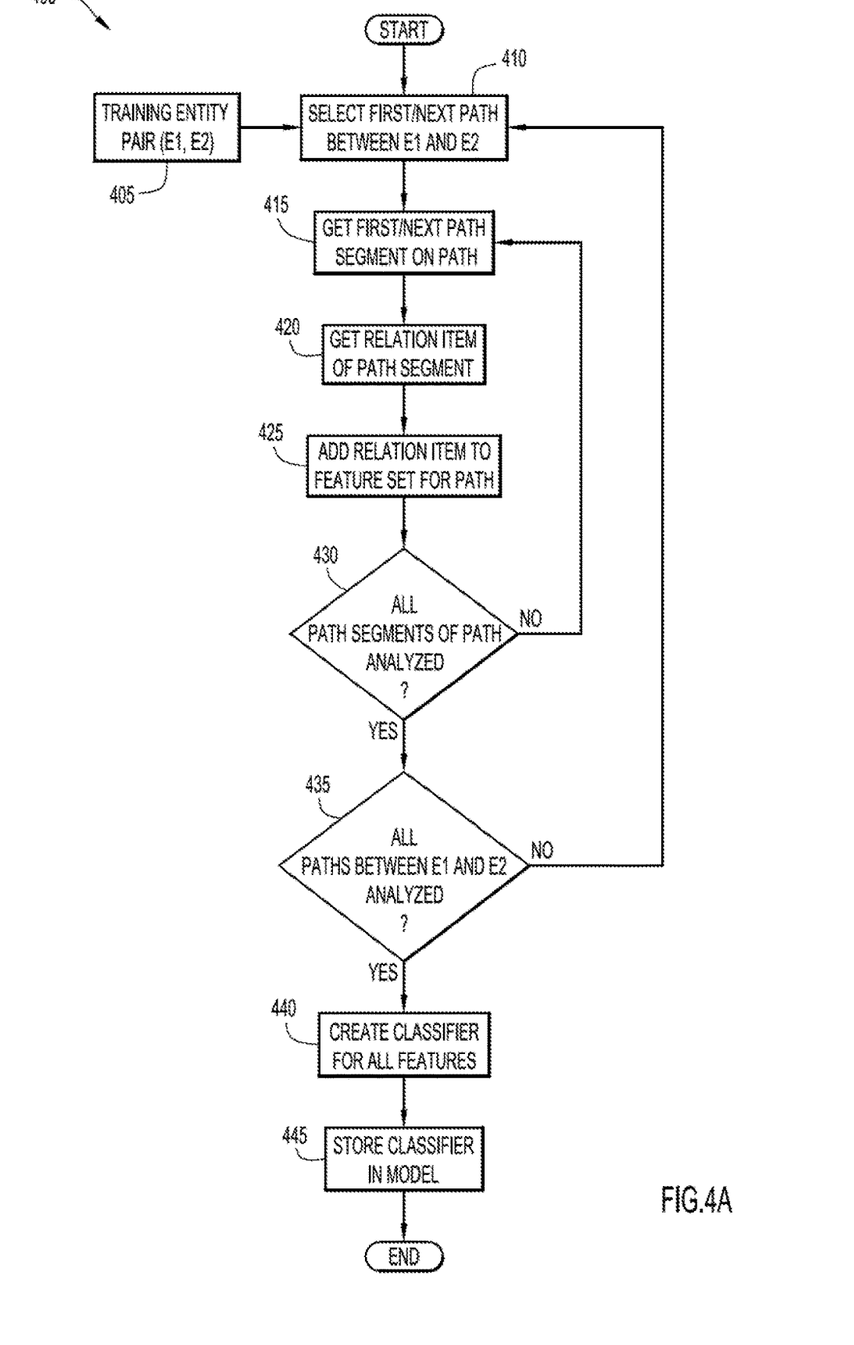
FIGS. 4A-4B are flow diagrams of a training process and a query process, respectively, by which the present general inventive concept can be embodied.
Figure 4B:
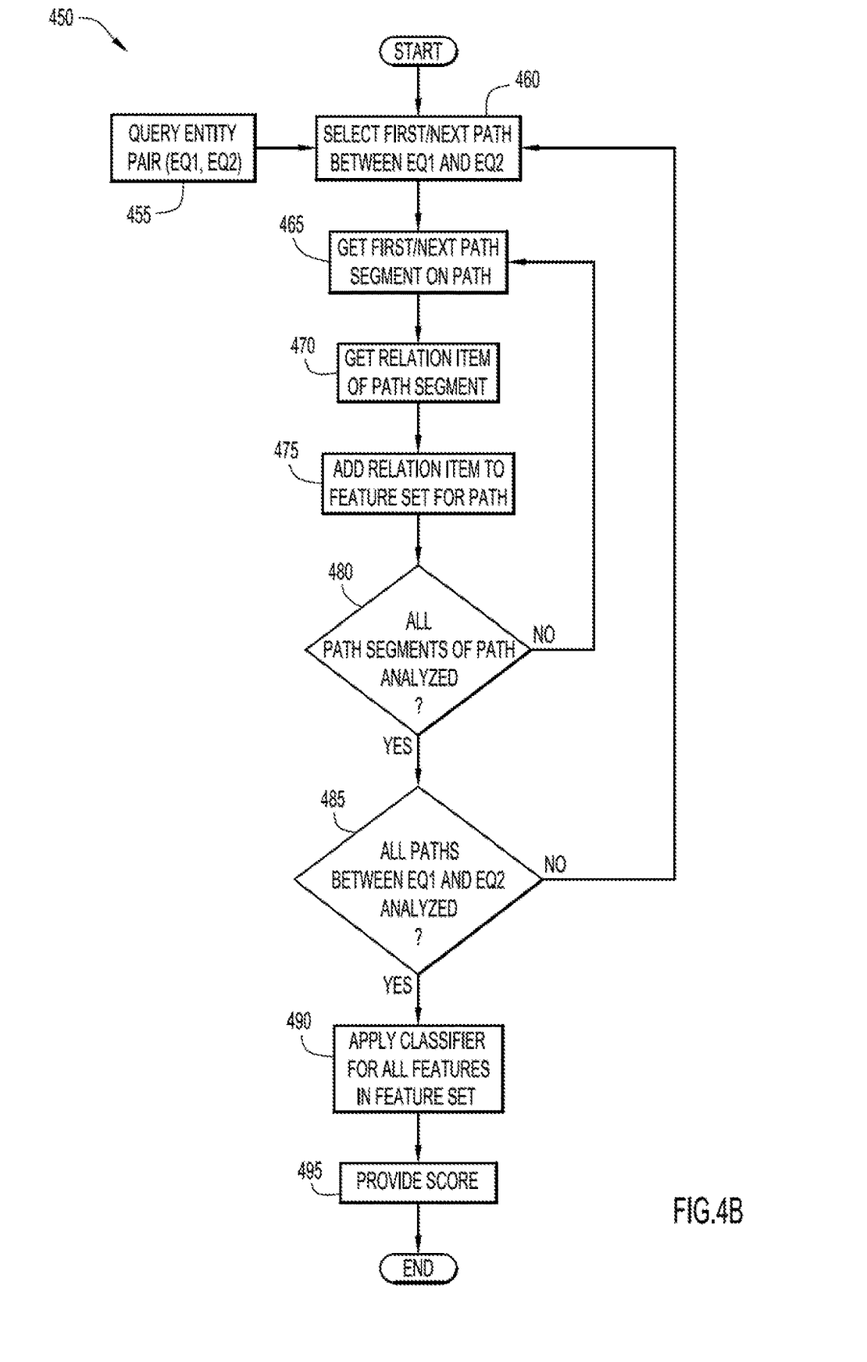

FIGS. 4A-4B, collectively referred to herein as FIG. 4, are flow diagrams of exemplary training process 400 and exemplary query process 450, respectively. As is illustrated in FIG. 4A, training entity pair 405 (E1, E2) may be provided or otherwise selected from knowledge base 27 and, in operation 410, a first path is selected from those connecting E1 and E2. In operation 415, the first path segment on the selected path may be obtained and, in operation 420, the relation item associated with the path segment may be obtained. In operation 425, the obtained relation item is added to a feature data structure for the path and, in operation 430, it is determined whether all path segments on the selected path have been analyzed. If not, training process 400 returns to operation 415, whereby the next path segment on the path is selected. If, however, all path segments of the selected path have been analyzed, as determined by operation 430, process 400 may transition to operation 435, whereby it is determined whether all paths between E1 and E2 have been analyzed. If not, training process 400 returns to operation 410, whereby the next path between E1 and E2 is selected. If, however, all paths have been analyzed, as determined by operation 435, process 400 may transition to operation 440, whereby a classifier is created for the feature data structures constructed from the paths. In operation 445, the classifier is stored.

As is illustrated in FIG. 4B, query entity pair 455 (EQ1, EQ2) may be provided or otherwise selected from knowledge base 27 and, in operation 460, a first path is selected from those connecting EQ1 and EQ2. In operation 465, the first path segment on the selected path may be obtained and, in operation 470, the relation item associated with the path segment may be obtained. In operation 475, the obtained relation item is added to a feature data structure for the path and, in operation 480, it is determined whether all path segments on the selected path have been analyzed. If not, query process 450 returns to operation 465, whereby the next path segment on the path is selected. If, however, all path segments of the selected path have been analyzed, as determined by operation 480, process 450 may transition to operation 485, whereby it is determined whether all paths between EQ1 and EQ2 have been analyzed. If not, the query process 450 returns to operation 460, whereby the next path between EQ1 and EQ2 is selected. If, however, all paths have been analyzed, as determined by operation 485, process 450 may transition to operation 490, whereby a classifier is applied for the feature data structures constructed from the paths. In operation 495, the classifier provides a relation score.

It will be appreciated that the embodiments described above and illustrated in the drawings represent only a few of the many ways of implementing embodiments for implicit knowledge discovery from structured data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., training process 400 and query process 450) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., training process 400 and query process 450) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., knowledge bases, relation models, etc.). The database system may be implemented by any number of any conventional or other databases, data stores or storage structures (e.g., files, databases, data structures, data or other repositories, etc.) to store information (e.g., knowledge bases, relation models, etc.). The database system may be included within or coupled to the server and/or client systems. The database systems and/or storage structures may be remote from or local to the computer or other processing systems, and may store any desired data (e.g., knowledge bases, relation models, etc.).

The present invention embodiments may employ any number of any type of user interface (e.g., Graphical User Interface (GUI), command-line, prompt, etc.) for obtaining or providing information (e.g., queries, supervised training actions, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, demographic information pertaining to the document author, etc.).

The present invention embodiments are not limited to the specific tasks or algorithms described above, but may be utilized for information systems in which information can be abstracted through a directed graph.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus comprising:
a memory that stores a knowledge base including predefined entities, wherein a graphical representation of the knowledge base includes nodes representing the predefined entities and edges coupling the nodes representing relationships between the predefined entities represented by the nodes, and wherein the relationships are indicated by predefined relation items;
a processor to:
receive a query for a plurality of entities;
identify paths in the graphical representation between the plurality of entities of the query, wherein the identified paths include intermediate entities along the paths and path segments coupling the intermediate entities to other entities, and wherein each path segment is associated with a predefined relation item;
collect the predefined relation items of the path segments of the identified paths;
assemble the collected predefined relation items into feature sets;
apply the feature sets to a machine learning classifier, wherein the machine learning classifier is trained with a training set of relation items along paths between known entities in the graphical representation; and
generate results for the query including a relation score indicating a measure of relatedness for the plurality of entities of the query using the machine learning classifier.

2. The apparatus of claim 1, wherein the processor is further configured to:
form generalized path statements from the predefined relation items collected from the path segments of the identified paths; and
provide the generalized path statements as the feature set.

3. The apparatus of claim 2, wherein the processor is further configured to:
replace entity names on each of the path segments with variables; and
interpose the variables between corresponding predefined relation items to form the generalized path statements.

4. The apparatus of claim 1, wherein the identified paths include positive and negative relations.

5. The apparatus of claim 1, wherein the predefined entities and relation items in the knowledge base are indicative of medical entities and relations.

6. A computer program product for implicit knowledge discovery in a knowledge base including predefined entities, wherein a graphical representation of the knowledge base includes nodes representing the predefined entities and edges coupling the nodes representing relationships between the predefined entities represented by the nodes, wherein the relationships are indicated by predefined relation items, the computer program product comprising a computer readable storage medium having program instructions embodied therewith, the program instructions executable by a processor to cause the processor to:
receive a query for a plurality of entities;
identify paths in the graphical representation between the plurality of entities of the query, wherein the identified paths include intermediate entities along the paths and path segments coupling the intermediate entities to other entities, and wherein each path segment is associated with a predefined relation item;
collect the predefined relation items of the path segments of the identified paths;
assemble the collected predefined relation items into feature sets;
apply the feature sets to a machine learning classifier, wherein the machine learning classifier is trained with a training set of relation items along paths between known entities in the graphical representation; and
generate results for the query including a relation score indicating a measure of relatedness for the plurality of entities of the query using the machine learning classifier.

7. The computer program product of claim 6, wherein the program instructions embodied on the computer readable storage medium include program instructions that cause the processor to:
form generalized path statements from the predefined relation items collected from the path segments of the identified paths; and
provide the generalized path statements as the feature set.

8. The computer program product of claim 7, wherein the program instructions embodied on the computer readable storage medium include program instructions that cause the processor to:
replace entity names on each of the path segments with variables; and
interpose the variables between corresponding predefined relation items to form the generalized path statements.

9. The computer program product of claim 6, wherein the identified paths include positive and negative relations.

10. The computer program product of claim 6, wherein the predefined entities and relation items in the knowledge base are indicative of medical entities and relations.

* * * * *